United States Patent
Eng et al.

(10) Patent No.: US 10,880,412 B1
(45) Date of Patent: Dec. 29, 2020

(54) SYSTEMS AND METHODS FOR COMMUNICATING BETWEEN A FLEET OF ROBOTS AND A FLEET MANAGER

(71) Applicant: Clearpath Robotics Inc., Kitchener (CA)

(72) Inventors: Denise Elaine Eng, Kitchener (CA); Michael Purvis, Kitchener (CA); Guillaume Autran, Kitchener (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 3 days.

(21) Appl. No.: 16/106,196

(22) Filed: Aug. 21, 2018

Related U.S. Application Data

(60) Provisional application No. 62/588,636, filed on Nov. 20, 2017, provisional application No. 62/548,066, filed on Aug. 21, 2017.

(51) Int. Cl.
*H04L 29/06* (2006.01)
*H04L 29/08* (2006.01)
*G06F 16/25* (2019.01)

(52) U.S. Cl.
CPC .............. *H04L 69/08* (2013.01); *H04L 67/02* (2013.01); *H04L 67/10* (2013.01); *H04L 67/12* (2013.01); *H04L 67/2823* (2013.01); *H04L 69/16* (2013.01); *H04L 69/329* (2013.01); *G06F 16/258* (2019.01)

(58) Field of Classification Search
CPC ..... H04L 67/02; H04L 67/10; H04L 67/2823; H04L 69/329; G06F 16/258
See application file for complete search history.

(56) References Cited

U.S. PATENT DOCUMENTS

| | | | | |
|---|---|---|---|---|
| 5,515,513 A | * | 5/1996 | Metzger | H04L 12/4625 370/401 |
| 6,633,630 B1 | * | 10/2003 | Owens | H04L 51/066 379/100.08 |
| 7,512,732 B1 | * | 3/2009 | Goossens | G06F 13/4027 710/315 |
| 7,773,548 B2 | * | 8/2010 | Iwatsu | H04L 65/4076 370/312 |

(Continued)

*Primary Examiner* — Lashonda T Jacobs
(74) *Attorney, Agent, or Firm* — Bereskin & Parr LLP/S.E.N.C.R.L., s.r.l.

(57) ABSTRACT

A sender device implements an auxiliary transport protocol by: storing routing records containing respective content type indicators, message source identifiers and message destination identifiers. A first record contains an initial content type indicator and a destination identifier corresponding to a sender device relay. A second record contains an extended content type indicator and a destination identifier corresponding to a sender device bridge. The sender device generates and routes an initial message having a payload and the initial content type indicator to the relay via a primary transport protocol according to the first record; at the relay, generates an extended message having the payload and the extended content type indicator, and routes the message to the bridge via the primary protocol according to the second record; at the bridge, generates a converted extended message; and transmits the converted extended message to a receiver device via the auxiliary protocol.

18 Claims, 7 Drawing Sheets

(56) References Cited

U.S. PATENT DOCUMENTS

| | | | | |
|---|---|---|---|---|
| 8,220,038 B1* | 7/2012 | Lucchesi | H04L 69/08 | 726/9 |
| 8,990,321 B1* | 3/2015 | Korn | H04L 51/066 | 709/206 |
| 9,258,137 B2* | 2/2016 | Ajitomi | H04L 67/2842 | |
| 9,916,404 B2* | 3/2018 | Garg | G06F 30/20 | |
| 10,097,293 B2* | 10/2018 | Sennett | H04H 20/59 | |
| 10,374,951 B2* | 8/2019 | Cardona | G06F 9/542 | |
| 10,530,506 B2* | 1/2020 | Sennett | H04W 4/44 | |
| 2008/0009965 A1* | 1/2008 | Bruemmer | G06N 3/008 | 700/245 |
| 2008/0009966 A1* | 1/2008 | Bruemmer | G06N 3/008 | 700/245 |
| 2010/0008367 A1* | 1/2010 | Van Ackere | H04L 45/04 | 370/395.31 |
| 2010/0135308 A1* | 6/2010 | Lee | H04L 12/4625 | 370/401 |
| 2011/0268126 A1* | 11/2011 | Matsuo | H04L 47/2441 | 370/400 |
| 2012/0221243 A1* | 8/2012 | Basson | G01C 21/00 | 701/468 |
| 2012/0259821 A1* | 10/2012 | Alam | G06F 16/1744 | 707/692 |
| 2013/0245857 A1* | 9/2013 | Gariepy | G05B 19/0428 | 701/2 |
| 2014/0115153 A1* | 4/2014 | Kim | H04L 41/0816 | 709/224 |
| 2015/0142832 A1* | 5/2015 | Pope | H04L 69/16 | 707/754 |
| 2016/0164619 A1* | 6/2016 | Sennett | H04W 4/44 | 455/404.1 |
| 2016/0285863 A1* | 9/2016 | Canavor | H04L 63/123 | |
| 2016/0360562 A1* | 12/2016 | Chong | H04W 4/025 | |
| 2017/0063566 A1* | 3/2017 | Seminario | H04L 63/029 | |
| 2017/0063675 A1* | 3/2017 | Miyabe | H04L 49/00 | |
| 2017/0208140 A1* | 7/2017 | Choi | H04L 41/12 | |
| 2017/0279874 A1* | 9/2017 | Jolfaei | H04L 67/1002 | |
| 2017/0339258 A1* | 11/2017 | Momchilov | H04L 69/18 | |
| 2018/0084055 A1* | 3/2018 | Mong | H04L 45/50 | |
| 2018/0131593 A1* | 5/2018 | Jain | H04L 12/66 | |
| 2018/0287996 A1* | 10/2018 | Tripathy | H04L 61/2503 | |
| 2019/0109713 A1* | 4/2019 | Clark | H04L 9/3239 | |
| 2019/0364424 A1* | 11/2019 | Vanderveen | H04W 12/02 | |

* cited by examiner

SYSTEMS AND METHODS FOR COMMUNICATING BETWEEN A FLEET OF ROBOTS AND A FLEET MANAGER

CROSS-REFERENCE TO RELATED APPLICATIONS

This application claims priority from U.S. Provisional Patent Application No. 62/548,066, filed 21 Aug. 2017, and U.S. Provisional Patent Application No. 62/588,636, filed 20 Nov. 2017, each titled "SYSTEMS AND METHODS FOR COMMUNICATING BETWEEN A FLEET OF ROBOTS AND A FLEET MANAGER". The contents of each are incorporated herein by reference for all purposes.

TECHNICAL FIELD

The specification relates generally to mobile self-driving vehicles, and specifically to systems and methods for implementing an auxiliary communications transport between mobile self-driving vehicles and a fleet manager.

BACKGROUND

Mobile self-driving vehicles (which may also be referred to as robots) operate in a wide variety of environments. Further, in a given environment, such as a warehouse, such robots may be deployed in fleets. The robots in a facility typically maintain wireless connections with one or more computing devices, such as a central server, in order to transmit data to, and receive data from, the server. The physical characteristics of certain facilities, alone or in combination with the size of the fleet of robots deployed therein, may impede the ability of the robots to maintain wireless connectivity with the server. For example, the presence of walls, metal shelving, and the like may result in frequent disconnections in the fleet.

Various software platforms are available to operate the above-mentioned fleets and control servers. Some widely deployed platforms (e.g. those based on the Robot Operating System (ROS) version 1.x) implement a transport protocol that is particularly vulnerable to the disruptions noted above. As a result, fleets implemented with such platforms may experience undesirably high connection losses, resulting in delayed exchange of critical control data between the fleet and the control server. The modification of fleets and associated servers to replace the above-mentioned transport protocol with a more reliable protocol (e.g. Distribution Service for real-time Systems (DDS)), however, may be time-consuming and costly.

SUMMARY

An aspect of the specification provides a method for implementing an auxiliary transport protocol for exchanging data between a sender computing device and a receiver computing device, comprising: storing, at the sender computing device, a plurality of routing records containing respective content type indicators and, for each content type indicator, (i) a message source identifier and (ii) a message destination identifier; the routing records including: a first routing record containing an initial content type indicator and a message destination identifier corresponding to a relay of the sender computing device; and a second routing record containing an extended content type indicator and a message destination identifier corresponding to a bridge of the sender computing device; responsive to generation of an initial message having a payload and the initial content type indicator, routing the initial message to the relay of the sender computing device over a first connection established via a primary transport protocol according to the first routing record; at the relay, responsive to receiving the initial message, generating an extended message having the payload and the extended content type indicator, and routing the message to the bridge of the sender computing device over a second connection established via the primary transport protocol according to the second routing record; at the bridge, responsive to receiving the extended message, generating a converted extended message for transmission via the auxiliary transport protocol; and transmitting the converted extended message to the receiver computing device via the auxiliary transport protocol.

A further aspect of the specification provides a non-transitory computer readable medium storing a plurality of computer-readable instructions executable by a processor of a sender computing device for performing the method.

A further aspect of the specification provides a computing device for implementing an auxiliary transport protocol for exchanging data between the computing device and a receiver computing device, comprising: a processor; a memory storing a plurality of routing records containing respective content type indicators and, for each content type indicator, (i) a message source identifier and (ii) a message destination identifier; the routing records including: a first routing record containing an initial content type indicator and a message destination identifier corresponding to a relay at the computing device; and a second routing record containing an extended content type indicator and a message destination identifier corresponding to a bridge at the sender computing device; and a communications interface; the processor configured to: responsive to generation of an initial message having a payload and the initial content type indicator, route the initial message to the relay over a first connection established via a primary transport protocol according to the first routing record; at the relay, responsive to receiving the initial message, generate an extended message having the payload and the extended content type indicator, and route the message to the bridge over a second connection established via the primary transport protocol according to the second routing record; at the bridge, responsive to receiving the extended message, generating a converted extended message for transmission via the auxiliary transport protocol; and control the communications interface to transmit the converted extended message to the receiver computing device via the auxiliary transport protocol.

BRIEF DESCRIPTIONS OF THE DRAWINGS

Embodiments are described with reference to the following figures, in which.

DETAILED DESCRIPTION

Figure 1:
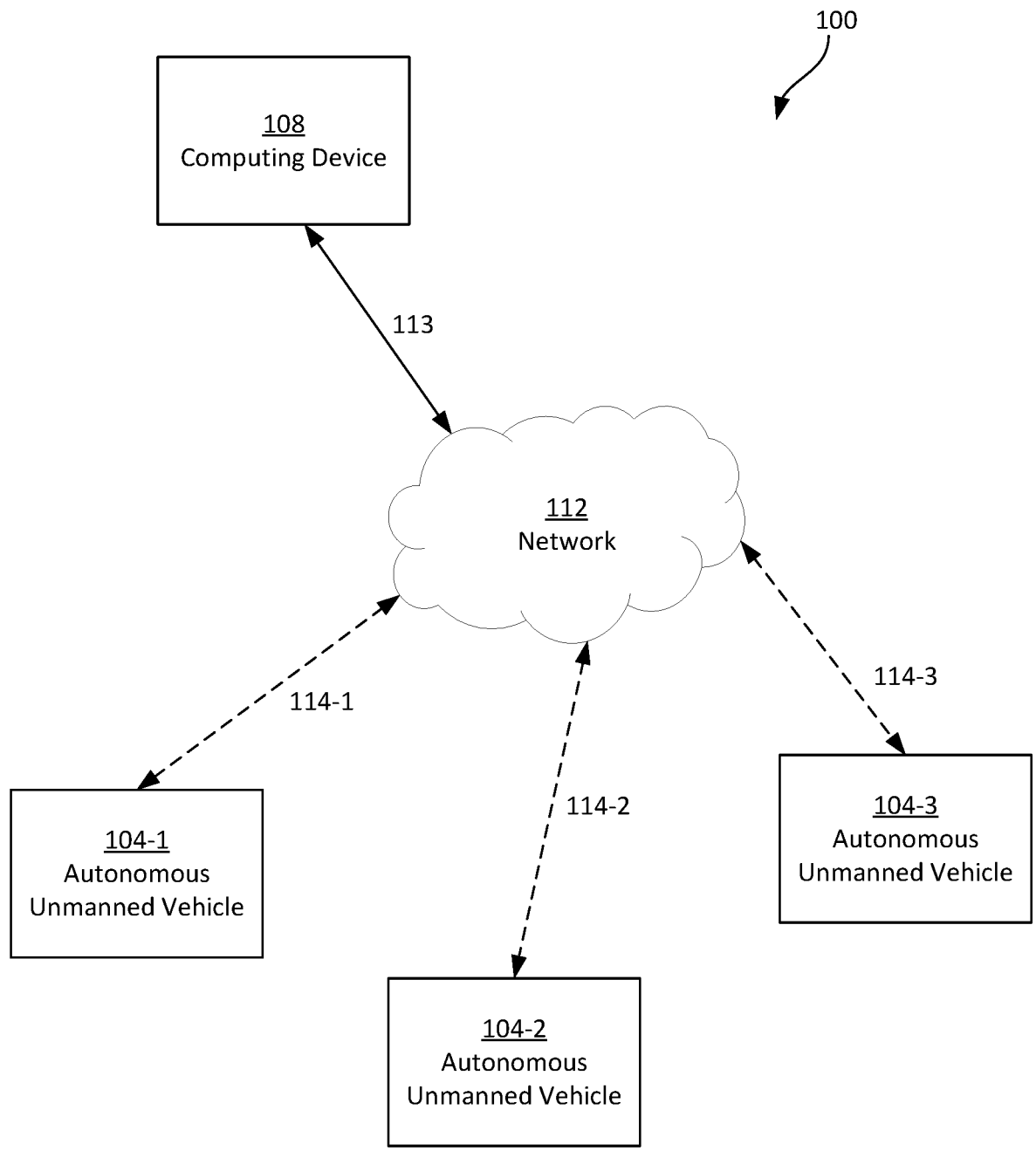
FIG. 1 depicts a system for communicating with self-driving vehicles.

FIG. 1 depicts a system 100 including a plurality of mobile self-driving vehicles 104-1, 104-2 and 104-3 (collectively referred to as self-driving vehicles 104, and generically referred to as a self-driving vehicle 104, or simply a vehicle 104; similar nomenclature is used in connection with other components described herein) for deployment in a facility, such as a manufacturing facility, warehouse or the like. The facility can be any one of, or any suitable combination of, a single building, a combination of buildings, an outdoor area, and the like. A greater or smaller number of self-driving vehicles 104 may be included in system 100 than the three shown in FIG. 1.

The system 100 also includes a computing device 108 for connection to the self-driving vehicles 104 via a network 112. The computing device 108 can be connected to the network 112 via any suitable combination of wired and wireless links. In the examples shown in FIG. 1, the computing device 108 is connected to the network 112 via a wired link 113. The self-driving vehicles 104, in the illustrated example, are connected to the network 112 via respective wireless links 114-1, 114-2 and 114-3. The links 114 can be any suitable combination of wired and wireless links in other examples, although generally wireless links are preferable to reduce or eliminate obstacles to the free movement of the vehicles 104 about the facility. The network 112 can be any suitable one of, or any suitable combination of, wired and wireless networks, including local area networks (LAN or WLAN), wide area networks (WAN) such as the Internet, and mobile networks (e.g. GSM, LTE and the like). Typically, the network 112 is a WLAN implemented by one or more access points within the facility.

The computing device 108 can control the self-driving vehicles 104, for example by instructing the self-driving vehicles 104 to carry out any of a variety of tasks within the facility. The nature of the tasks performed by the self-driving vehicles 104 under the control of computing device 108 is not particularly limited. In general, the tasks assigned to the self-driving vehicles 104 require the self-driving vehicles 104 to perform various actions at various locations within the facility. The computing device 108 is therefore configured to transmit data defining such tasks to the vehicles 104 via the network 112. The vehicles 104, in turn, are configured to report status data to the computing device 108. For example, each vehicle 104 can be configured to report its current location to the computing device 108 via the network 112. More generally, as will now be apparent to those skilled in the art, the computing device 108 and the vehicles 104 are configured to exchange data with one another over the network 112.

In order to exchange data as noted above, the computing device 108 and the vehicles 104 are each configured to implement a primary transport protocol and an auxiliary transport protocol. In particular, the primary transport protocol is implemented for internal data exchanges (e.g. between various processing nodes within a given vehicle 104), while the auxiliary transport protocol is implemented for data exchanges between different vehicles 104, or between vehicles 104 and the computing device 108. As will be apparent in the discussion below, the primary transport protocol may be a legacy protocol such as the TCP/IP-based transport protocol of the ROS 1.x platform. The auxiliary transport protocol, on the other hand, may be a protocol selected for greater reliability than the primary transport protocol for the wireless exchange of data via the network 112.

Before describing the implementation of the primary and auxiliary transport protocols by the system 100 in greater detail, certain components of an example vehicle 104, and of the computing device 108, will be described.

Figure 2:
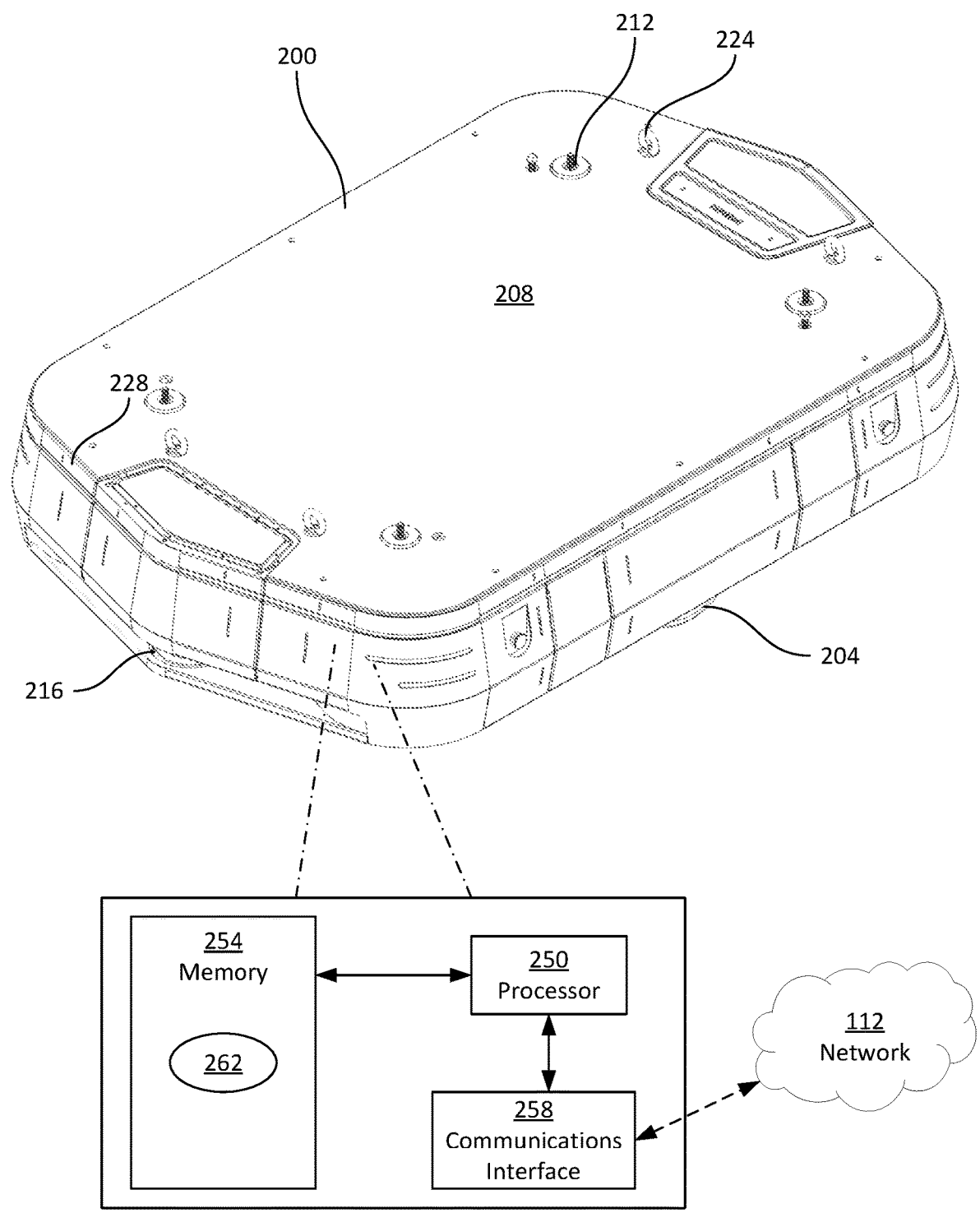
FIG. 2 depicts certain components of a self-driving vehicle of the system of FIG. 1.

Referring now to FIG. 2, an example self-driving vehicle 104 is shown. Each of the vehicles 104-1 to 104-3 shown in FIG. 1 are generally configured as described below. The self-driving vehicle 104 is depicted as a terrestrial vehicle, although it is contemplated that self-driving vehicles 104 can also include aerial vehicles and watercraft. The self-driving vehicle 104 includes a chassis 200 containing or otherwise supporting various other components, including one or more locomotive devices 204. The locomotive devices 204 in the present example are wheels, although in other embodiments any suitable locomotive device, or combination thereof, may be employed (e.g. tracks, propellers, and the like).

The locomotive devices 204 are powered by one or more motors (not shown) contained within chassis 200. The motors of the self-driving vehicle 104 can be electric motors, internal combustion engines, or any other suitable motor or combination of motors. In general, the motors drive the locomotive devices 204 by drawing power from an energy storage device (not shown) supported on or within the chassis 200. The nature of the energy storage device can vary based on the nature of the motors. For example, the energy storage can include batteries, combustible fuel tanks, or any suitable combination thereof.

The self-driving vehicle 104 also includes a load-bearing surface 208 (also referred to as a payload surface), for carrying items (e.g. boxes, pallets and the like). In some examples, the payload surface 208 can be replaced or supplemented with other payload-bearing equipment, such as a cradle, a manipulator arm, or the like.

The self-driving vehicle 104 can also include a variety of sensors. In the present example, such sensors include at least one load cell 212 coupled to the payload surface 208, for measuring a force exerted on the payload surface 208 (e.g. by an item being carried by the self-driving vehicle 104). The sensors of the self-driving vehicle 104 can also include machine vision sensors 216, such as any suitable one of, or any suitable combination of, barcode scanners, laser-based sensing devices (e.g. a LIDAR sensor), cameras and the like. The self-driving vehicle 104 can also include a location sensor (not shown) such as a GPS sensor, for detecting the location of self-driving vehicle 104 with respect to a frame of reference. The frame of reference is not particularly limited, and may be, for example, a global frame of reference (e.g. GPS coordinates), or a facility-specific frame of reference. Other sensors that can be provided with self-driving vehicle 104 include accelerometers, fuel-level or battery-level sensors, and the like.

The self-driving vehicle 104 can also include one or more anchors 224 for securing items or other equipment to the chassis 200, or for lifting the chassis 200 (e.g. for maintenance). The self-driving vehicle 104 can also include any of a variety of other features, such as indicator lights 228.

The self-driving vehicle 104 also contains an onboard computing device, including a central processing unit (CPU) 250, also referred to as a processor 250, interconnected with a non-transitory computer-readable medium such as a memory 254. The processor 250 and the memory 254 are generally comprised of one or more integrated circuits (ICs), and can have a variety of structures, as will now occur to those skilled in the art (for example, more than one CPU can be provided). The memory 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

The onboard computing device of the self-driving vehicle 104 also includes a communications interface 258 (e.g. a network interface controller (NIC)) interconnected with the processor 250. Via the communications interface 258, the link 114 and network 112, the processor 250 can send and receive data to and from the computing device 108. For example, the self-driving vehicle 104 can send updated location data to the computing device 108, and receive task assignments and other data from the computing device 108. Additionally, the processor 250 is interconnected with the other components of the self-driving vehicle 104 mentioned above, such as the sensors 212 and 216.

The memory 254 stores a plurality of computer-readable programming instructions, executable by the processor 250, in the form of various applications, including a vehicle control application 262. As will be understood by those skilled in the art, the processor 250 can execute the instructions of application 262 (and any other suitable applications stored in the memory 254) in order to perform various actions defined within the instructions. In the description below the processor 250, and more generally any vehicle 104, is said to be configured to perform certain actions. It will be understood that the vehicle 104 is so configured via the execution (by the processor 250) of the instructions of the application 262 stored in memory 254.

Figure 3:
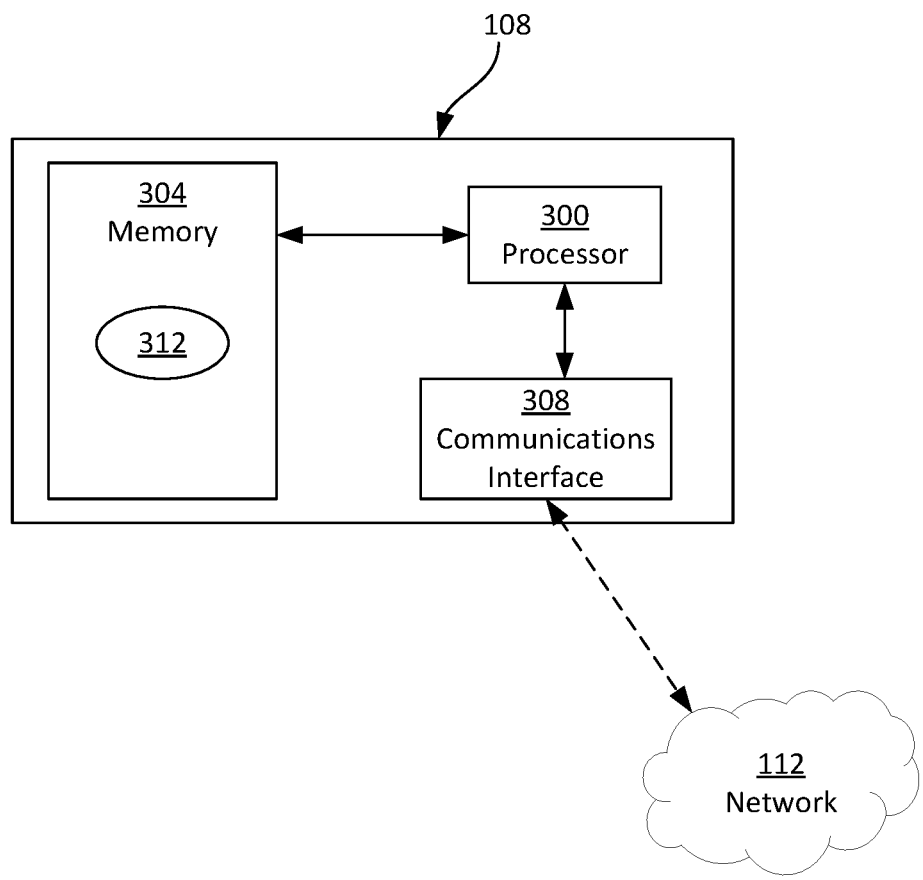
FIG. 3 depicts certain internal components of the computing device of FIG. 1.

Turning now to FIG. 3, certain internal components of the computing device 108 are illustrated. The computing device 108 can be any one of, or any combination of, a variety of computing devices. Such devices include desktop computers, servers, mobile computers such as laptops and tablet computers, and the like. The computing device 108 therefore includes at least one central processing unit (CPU), also referred to herein as a processor, 300. The processor 300 is interconnected with a non-transitory computer-readable medium such as a memory 304. The processor 300 is also interconnected with a communications interface 308.

The processor 300 and the memory 304 are generally comprised of one or more integrated circuits (ICs), and can have a variety of structures, as will now occur to those skilled in the art (for example, more than one CPU can be provided). The memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

The communications interface 308 allows the computing device 108 to connect with other computing devices (e.g. the onboard computing devices of the self-driving vehicles 104) via the network 112. The communications interface 308 therefore includes any necessary hardware (e.g. network interface controllers (NICs), radio units, and the like) to communicate via the network 112 over the link 113. The computing device 108 can also include input and output devices, such as keyboards, mice, displays, and the like (not shown).

The memory 304 stores a plurality of computer-readable programming instructions, executable by the processor 300, in the form of various applications, including a fleet control application 312. As will be understood by those skilled in the art, the processor 300 can execute the instructions of the application 312 (and any other suitable applications) in order to perform various actions defined within the instructions. In the description below, the processor 300, and more generally the computing device 108, are said to be configured to perform those actions. It will be understood that they are so configured via the execution (by the processor 300) of the instructions of the applications stored in memory 304.

Figure 4:
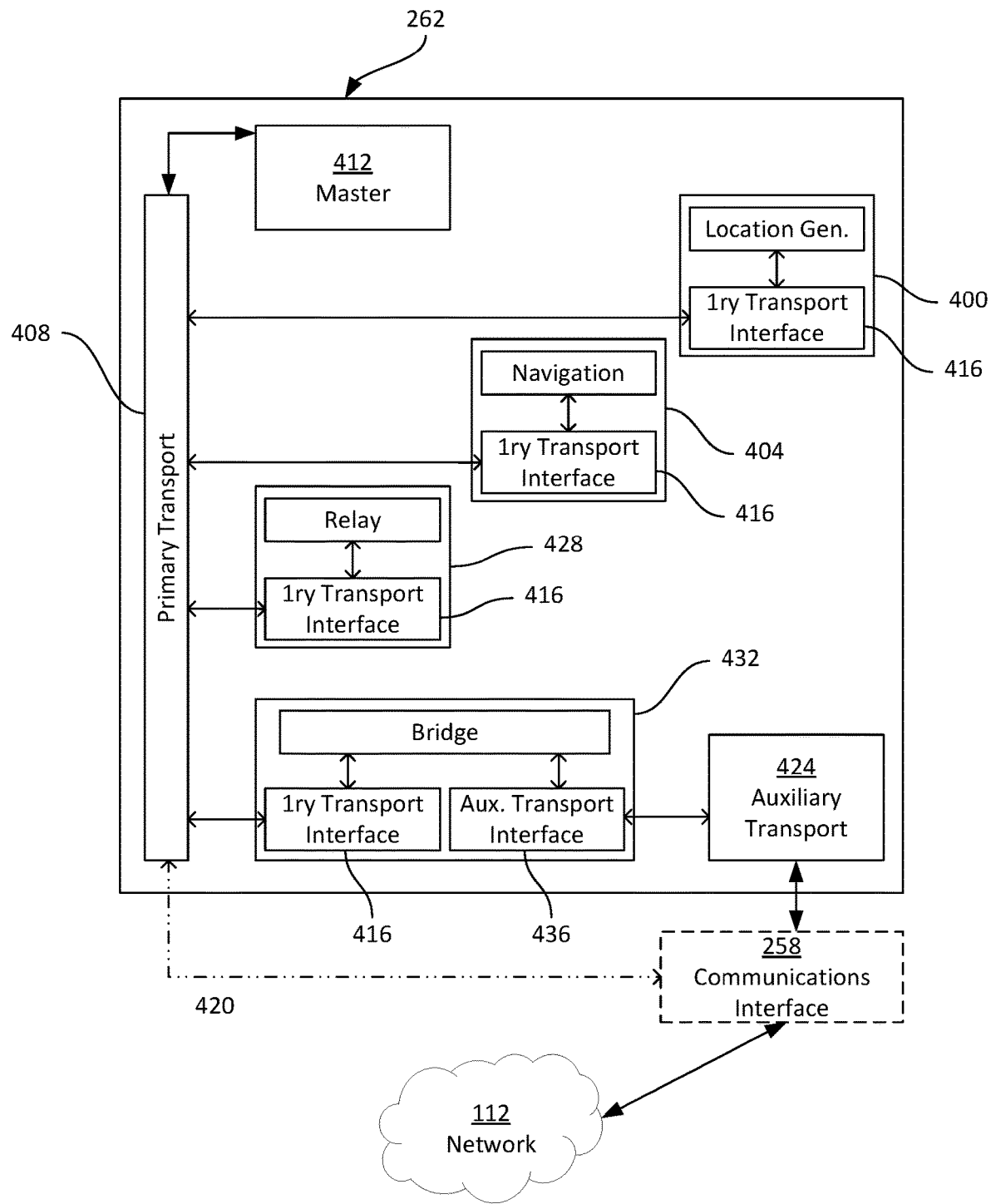
FIG. 4 depicts certain components of a control application of the self-driving vehicle of FIG. 2.

Turning now to FIG. 4, certain components of the application 262 are illustrated. In other embodiments, any one or more of the components shown in FIG. 4 may be implemented as distinct applications in the vehicle 104. In further embodiments, any one or more of the components shown in FIG. 4 may be implemented by dedicated hardware elements, such as one or more field programmable gate arrays (FPGAs), application-specific integrated circuits (ASICs), or the like.

In general, the application 262 includes a plurality of processing nodes, each of which is executable by the processor 250 to perform any of a variety of functions, including the receipt and processing of data from sensors of the vehicle 104, the receipt and processing of data received from the computing device 108, the control of other components of the vehicle 104 (e.g. the locomotive devices 204 mentioned earlier), and the like. An example node is shown in the form of a location generator node 400-1, configured to receive data representing a current location of the vehicle 104 (referred to as location data) from the above-mentioned location sensor and provide the location data for use by other nodes of the vehicle 104. Such other nodes may include a navigation node 404, configured to receive commands from the computing device 108, as well as the location data produced by the location generator node 400, and to generate navigational data (e.g. a path) for controlling the locomotive devices 204. A wide variety of other nodes may also be included in the application 262, as will be apparent to those skilled in the art.

The application 262 further includes a primary transport component 408 configured to implement a primary transport protocol to enable the exchange of data between nodes within the application 262 (e.g. the nodes 400 and 404). In the present example, the application 262 is based on the ROS 1.x platform, and the primary transport 408 is therefore a ROS 1.x transport (e.g. implementing the TCPROS protocol, which is based on the transmission control protocol/internet protocol (TCP/IP)). As will now be apparent to those skilled in the art, the nodes of the application 262 can exchange data via the primary transport 408 by registering publication and subscription data (generally referred to herein as routing data), for example with a master node 412. A node, such as the location generator node 400, advertises data that it generates by registering itself with the master 412 as a publisher, or source, of that data, as identified by a content type indicator (also referred to as a topic). Nodes may also register with the master 412 as subscribers (or destinations) of data identified by content type indicators. Thus, for example, the node 400 may register as a publisher of data having a content type indicator "location", and the node 404 may register as a subscriber to the content type indicator "location".

The presence of both a publisher and a subscriber in a routing record maintained at the master 412 results in the establishment of a persistent connection between the publisher and the subscriber. Such a connection may be defined, for example, by an IP address and port assigned to the relevant nodes. Connection parameters defining each such connection may be maintained within the primary transport

408. Each node transmits or receives messages via the above connections by way of a primary transport interface 416 (e.g. an application programming interface (API) enabling each node to access the primary transport 408). Thus, for example, the location generator node 400 generates a message containing a current location of the vehicle 104, and transmits a publication command to the primary transport 408 via the instance of the primary transport interface 416 included in the node 400. When a connection with another node (e.g. the node 404) has been established, the message is transmitted to the other node via the primary transport 408 and the corresponding instance of the primary transport interface 416.

In a conventional implementation of the ROS 1.x platform, the primary transport 408 is also employed to carry messages destined for other computing devices. That is, the master 412 may be synchronized with a corresponding master at another device, such as the computing device 108, and thus may contain a routing record indicating a destination for data generated by the node 400 that resides in the computing device 108. In a conventional ROS 1.x implementation, the primary transport 408 controls the communications interface 258 (via a link 420) to send, for example, location data generated by the node 400.

In the present example, however, the link 420 is not employed. Instead, the primary transport 408 is employed for internal (that is, within the application 262) data exchange. However, data exchange with nodes external to the application 262 is conducted via an auxiliary transport 424, which is configured to control the communications interface 258 according to an auxiliary transport protocol distinct from the primary transport protocol. In the present example, the auxiliary transport 424 implements the Data Distribution Service for real-time systems (DDS) standard. A variety of suitable implementations may be employed, including that of the ROS 2.x platform.

To that end, the application 262 includes two additional nodes configured to perform certain functions to enable the use of the auxiliary transport 424. Specifically, the application 262 includes a relay node 428 and a bridge node 432. The relay node 428 is configured to translate between a content type indicator employed by one or more of the other nodes (e.g. the nodes 400 or 404) and an associated extended content type indicator. That is, as will be described in greater detail below, the relay node 428 is configured to perform one or both of an outbound translation and an inbound translation. In an outbound translation, the relay node 428 subscribes to a given content type indicator generated within the application 262 and, for any message received for that content type indicator, re-publishes the message with an extended content type indicator distinct from the initial content type indicator. In an inbound translation, the relay node 428 subscribes to an extended content type indicator corresponding to messages received at the application 262 and, for any messages received with the extended content type indicator, re-publishes the messages with the corresponding initial content type indicator. In other words, the relay node 428 is configured to translate messages to between a local namespace employed within the application 262, and a global namespace employed within the system 100.

The bridge node 432 is configured to convert messages between a first format for transmission via the primary transport 408 and a second format for transmission via the auxiliary transport 424. As will be described in greater detail below, the bridge node 432 is configured to both subscribe to, and publish, the above-mentioned extended content type indicator(s) published by the relay node 428. In particular, the bridge node 432 is configured to receive messages having the extended content type indicator from the relay node 428 via an instance of the primary transport indicator 416, and to publish converted messages having the same extended content type indicator via an auxiliary transport interface 436, for transmission via the communications interface 258. The bridge node 432 is further configured to receive messages via the auxiliary transport 424 having the extended content type indicator, to convert the messages for transmission via the primary transport interface, and to publish the converted (i.e. converted from auxiliary to primary transport protocol) messages, still bearing the extended content type indicator, for transmission via the primary transport 408. As noted earlier, the relay node 428 subscribes to the extended content type indicator, and thus receives the above-mentioned converted messages from the bridge node 432 to perform an inbound translation thereon.

Figure 5:
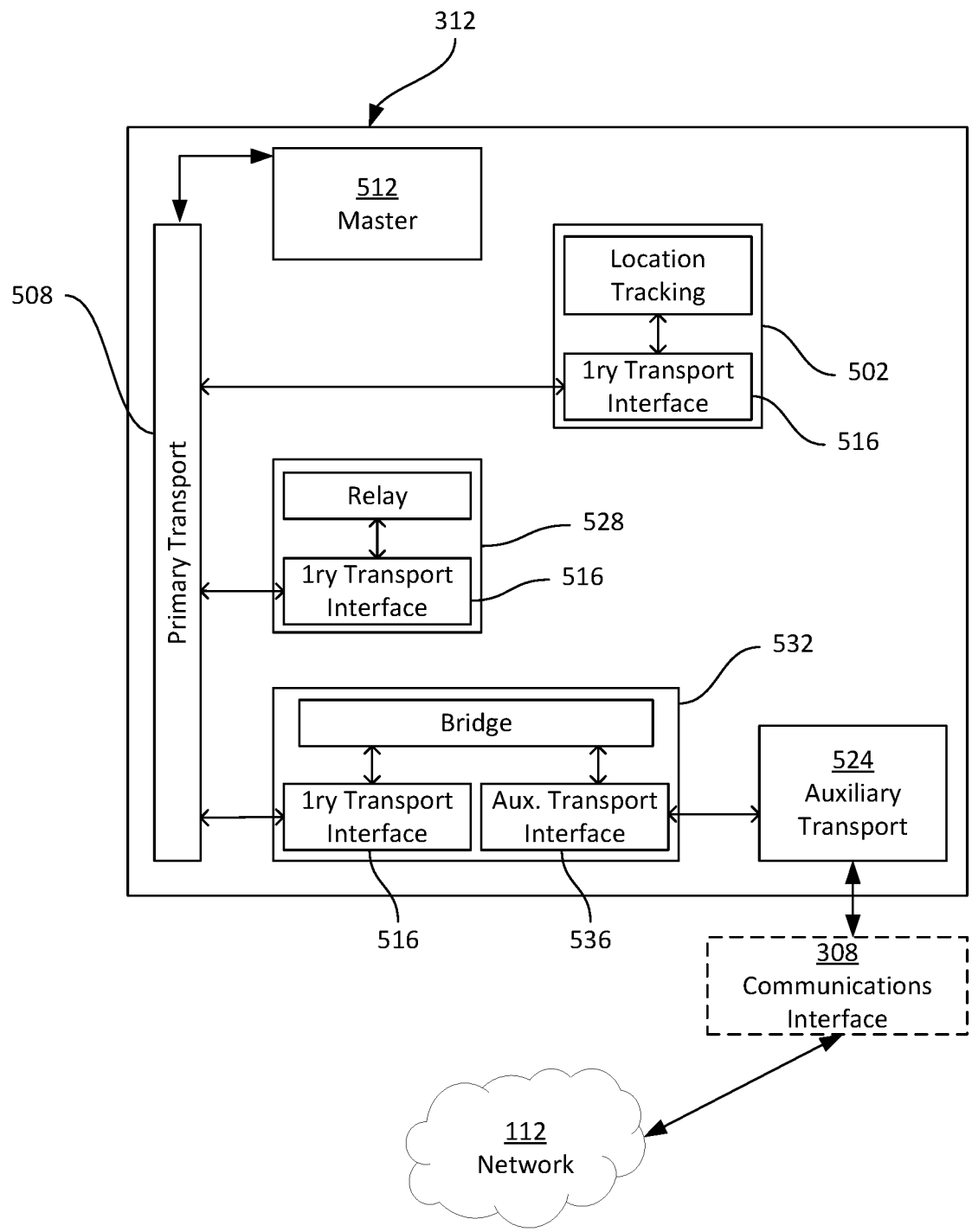
FIG. 5 depicts certain components of a control application of the computing device of FIG. 3.

Turning to FIG. 5, certain components of the application 312 are illustrated. As will be apparent, the application 312 includes a number of components that are equivalent to those discussed above in connection with the application 262. In particular, components bearing the same suffix, but with a leading "5" rather than a leading "4", are as described above in connection with the application 262. Thus, the application 312 includes a primary transport 508 accessed by processing nodes via respective instances of a primary transport interface 516 to exchange messages over connections established according to routing records stored by a master 512. The nodes of the application 312 include a relay node 528 that translates between namespaces, and a bridge node 532 that converts messages received via the primary transport 508 for transmission via an auxiliary transport 524 (accessed via an auxiliary transport interface 536), and vice versa.

As will be apparent to those skilled in the art, although each vehicle 104 typically includes the same processing nodes (e.g. nodes 400 and 404), the computing device 108 typically includes a different set of processing nodes. In the present example, the application 312 includes a node 502 that is configured to track locations of the vehicles 104 (i.e., as generated by the node 400, in the present example).

The functionality of the applications 262 and 312, and particularly the functionality of the relay nodes 428 and 528 and the bridge nodes 432 and 532, will be discussed in greater detail in connection with FIGS. 6 and 7, which illustrate methods 600 and 700, respectively, of sending and receiving data via an auxiliary transport protocol.

Figure 6:
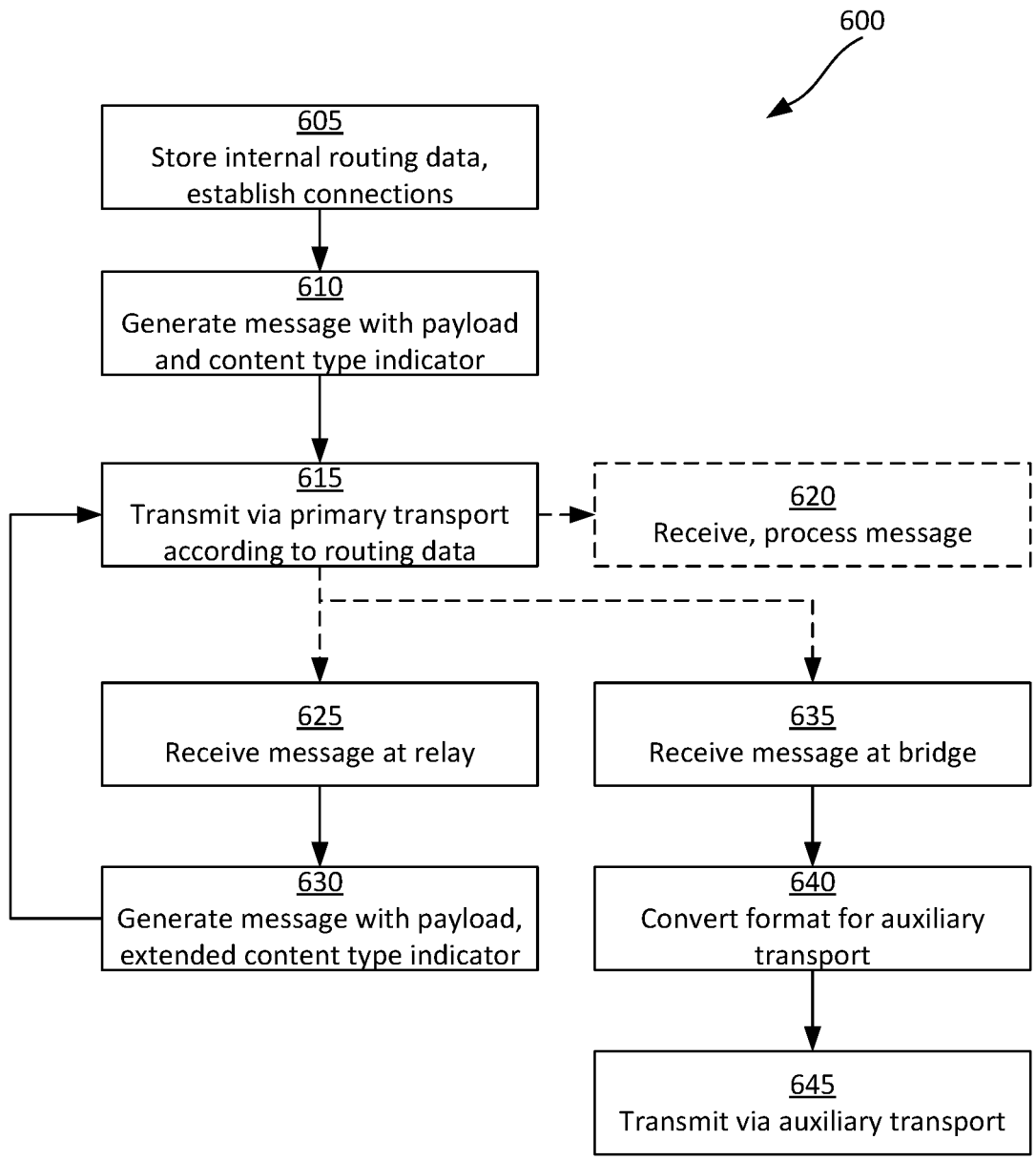
FIG. 6 depicts a method of sending data via an auxiliary transport protocol in the system of FIG. 1.
Figure 7:
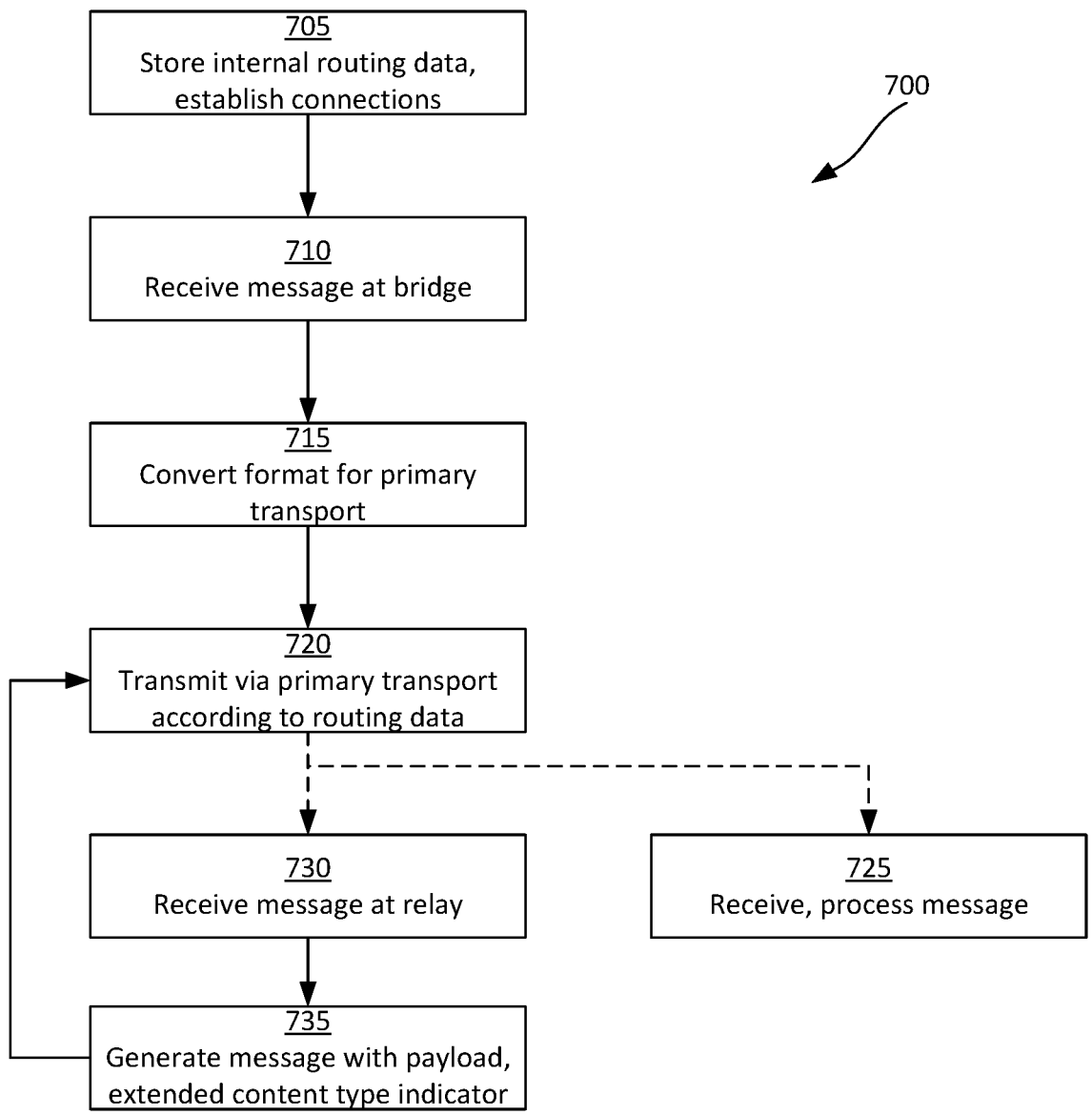
FIG. 7 depicts a method of receiving data via an auxiliary transport protocol in the system of FIG. 1.

Turning to FIG. 6, an example performance of the method 600 to generate data for transmission from a vehicle 104 to the computing device 108 will be described. As will now be apparent, in other performances, the sender may be the computing device 108 while the receiver may be a vehicle 104. Indeed, the computing device 108 and the vehicle 104 may each act as sender for certain topics and as receiver for others.

At block 605, the vehicle 104 (and specifically, the master 412 of the application 262) is configured to store a plurality of routing records. Each routing record corresponds to a particular content type indicator, and is created responsive to a registration request from one of the nodes of the application 262. To that end, each node of the application 262 contains a listing (e.g. in a configuration file) of content type indicators that the node publishes to, subscribes to, or both. Table 1, below, provides an example set of routing records stored in the master 412.

TABLE 1

Example Routing Records (Application 262)

| Content Type Indicator | Sources | Destinations |
|---|---|---|
| location | Location Gen. 400 | Relay 428 |
| 104-1/location | Relay 428 | Bridge 432 |
| . . . | . . . | . . . |

Although each routing record contains a single source identifier (i.e. publisher identifier) and a single destination identifier (i.e. subscriber), in other embodiments each routing record may contain one or more source identifier, and one or more destination identifier. Further, Table 1 employs the names introduced in connection with FIG. 4 for clarity. In a typical implementation, however, the source and destination identifiers are stored as network identifiers, such as IP address and port number pairs.

As seen above, the routing records stored by the master 412 include at least a first record containing an initial content type indicator ("location") and a destination identifier corresponding to the relay 428. The first routing record is generated the receipt of two registration requests at the master 412: a request from the node 400 indicating that the node 400 publishes messages with the location content type indicator, and a request from the relay node 428 indicating that the relay node 428 subscribes to messages with the location content type indicator.

The routing records further include at least a second routing record containing an extended content type indicator and a destination identifier corresponding to the bridge node 432. The second routing record is generated the receipt of two registration requests at the master 412: a request from the relay node 428 indicating that the relay 428 publishes messages with the extended content type indicator "104-1/location", and a request from the bridge node 432 indicating that the bridge node 432 subscribes to the extended content type indicator "104-1/location". The relay node 428 and the bridge node 432 can be configured to generate the above requests, for example, by retrieving a name of the vehicle 104 (specifically, the vehicle 104-1 in this example) from the memory 254 and prepending the vehicle name to the content type indicator "location". In other embodiments, a wide variety of other extended content type indicators may be employed.

At block 610, a processing node (i.e. other than the relay node 428 or the bridge node 432) is configured to generate an initial message having a payload and the initial content type indicator mentioned above. In the present example, at block 610 the node 400 is configured to generate an initial message having the content indicator "location" and containing (i.e. having a payload consisting of) a current location of the vehicle 104-1. As will be apparent to those skilled in the art, the master 412 is configured, responsive to the registration process discussed above, to cause the establishment of connections between the relevant nodes via the primary transport 408. Thus, persistent connections are established between the node 400 and the relay 428, and between the relay 428 and the bridge 432.

At block 615, the node 400 is configured to transmit the message via the primary transport 408, and more specifically, via the connection with the relay 428 established according to the first routing record. As will be apparent, the processing nodes of the application 262 may generate messages having content type indicators to which the relay 428 does not subscribe, but to which other processing nodes may subscribe. In such embodiments, the performance of the method 600 proceeds to block 620, at which the other subscribing processing node(s) receive and process the message. In the present example, however, the performance of the method 600 proceeds to block 625, at which the relay node 428 is configured to receive the message containing the current location of the vehicle 104-1. Specifically, the message is received at the relay 428 via the primary transport 408 and the corresponding primary transport interface 416.

At block 630, the relay 428 is configured to generate an extended message containing the same payload as the message received at block 625, but having an extended content type indicator rather than the initial content type indicator. For example, the relay 428 can store one or more mappings between a content type indicator and an extended content type indicator. In general, the relay 428 can be configured to receive a message having one of a content type indicator and the corresponding extended content type indicator, and to generate a message with the other of the content type indicator and the corresponding extended content type indicator. In the present example, therefore, the relay 428 generates a message containing the current location of the vehicle 104-1 and having the extended content type indicator "104-1/location".

Having generated the extended message, the relay 428 is configured to perform block 615, to route the message to the bridge node 432 via the primary transport 408 (specifically, over a connection established via the primary transport 408 according to the second routing record shown in Table 1). Following this second performance of block 615, the bridge node 432 is configured to receive the extended message at block 635. At block 640, the bridge node 432 is configured to generate a converted extended message for transmission via the auxiliary transport 424. For example, the bridge node 432 can store (e.g. in a configuration file) a mapping between (i) fields and other formatting data for the extended message received via the primary transport 408 and (ii) fields and other formatting data for the converted message. The conversion is performed according to the mapping, e.g. by extracting data from the extended message and placing the data into the fields of the converted message as specified by the above-mentioned mapping.

Having generated the converted extended message, the bridge node 432 is configured to transmit the converted extended message via the auxiliary transport 424. In particular, the bridge node 432 is configured, having received the extended message via subscription to the content type indicator "104-1/location", to publish the converted extended message also having the content type indicator "104-1/location" via the auxiliary transport interface 436 at block 645. Although the converted message published at block 645 bears the same extended content type indicator as the extended message published by the relay 428 and received by the bridge 432, the converted message is not published via the primary transport 408, and therefore does not conflict with the routing records stored by the master 412. Instead, the auxiliary transport interface 436 and the auxiliary transport 424 maintain distinct routing data from the routing records described above. As will be apparent to those skilled in the art, auxiliary transports such as DDS include discovery and connection establishment functionality, and the auxiliary transport 424 is therefore assumed to have established a connection with the auxiliary transport 524 of the computing device 108, independently of the connections established via the primary transports 408 and 508.

At block 645, the converted extended message is therefore transmitted, via the communications interface 258 and the network 112, to the computing device 108. The computing device 108, and particularly the application 312, is configured to receive and process the converted extended message as described below with reference to FIG. 7.

At block 705, the computing device 108 (or, as noted above, any other suitable receiver device) is configured to store routing records, via a registration process similar to that described above in connection with block 605. In the present example, it is assumed that the node 502 sends a registration request to the master 512 to subscribe to the extended content type indicator "104-1/location". Further, the bridge 532 is configured to send a registration request to the master 512 to indicate that the bridge 532 publishes messages with the extended content type indicator "104-1/location". As will now be apparent, since the node 502 subscribes to the extended content type indicator rather than the initial content type indicator ("location"), the relay 528 may be configured not to register for any content type indicators, as no namespace translation is required at the computing device 108 in this example. However, in other examples, the relay 528 is configured to register as a subscriber to the extended content type indicator and as a publisher of a distinct content type indicator (which need not be the same as the initial content type indicator "location"). In such embodiments the node 502 is also configured to register as a subscriber to the content type indicator published by the relay 528 rather than the extended content type indicator. Table 2, below, illustrates an example routing record stored at block 705.

TABLE X

Example Routing Records (Application 312)

| Content Type Indicator | Sources | Destinations |
|---|---|---|
| 104-1/location | Bridge 532 | Location Tracking 502 |
| ... | ... | ... |

As will now be apparent, the routing record stored at block 705 result in the establishment of a connection over the primary transport 508 between the bridge 532 and the node 502. At block 710, the application 312 is configured to receive a message at the bridge 532. In particular, the message is received via the auxiliary transport 524 and the auxiliary transport interface 536. At block 715, the bridge 532 is configured to convert the message received at block 710 to a format for transmission via the primary transport 508. In other words, the conversion at block 715 is the reverse of the conversion performed by the bridge 432 of the vehicle 104. The bridge 532, in other words, may include the same mapping of fields or other message definition data as is included in the bridge 432.

At block 720, the bridge 532 is configured to transmit the message generated at block 715, which is effectively the message received by the bridge 432 at block 635 (prior to conversion for transmission via the auxiliary transport 424), via the primary transport 508. In the present example, the message is transmitted to the node 502, which receives the message at block 725 for further processing. In other examples, in which the relay 528 is configured to apply namespace translation on inbound messages at the computing device 108, the message is routed to the relay 528 (either instead of or in addition to the node 502), where the message is received at block 730. The relay 528 is then configured, at block 735, to generate an extended message as described above in connection with block 630. For example, in other embodiments the relay 528 is configured to remove the extension "104-1" to the content type indicator, returning the content type indicator to "location". In further embodiments, the relay 528 is configured to replace the extended content type indicator with a content type indicator distinct from both the extended and initial indicators. Following namespace translation at block 735, the relay is configured to transmit the message at block 720.

As seen in the discussion above, the implementation of a relay (428, 528) in conjunction with a bridge (432, 532) permits the relay nodes to be configured to select which messages (that is, which content types, or topics) are to be prepared for transmission via an auxiliary transport (424, 524) while permitting other messages to be exchanged locally via the primary transport (408, 508).

Variations to the above systems and methods are contemplated. For example, the relay nodes 428 and 528 may be configured to republish messages to any one of a plurality of extended content type indicators, or to republish messages to more than one extended content type indicators simultaneously. In such embodiments, the applications 262 and 312 may each include a distinct bridge for each extended content type indicator, permitting different message types to be transmitted via different auxiliary transports. In other embodiments, a given bridge may subscribe to a plurality of extended content type indicators, enabling a single bridge to transmit a plurality of message types via a single auxiliary transport.

The scope of the claims should not be limited by the embodiments set forth in the above examples, but should be given the broadest interpretation consistent with the description as a whole.

The invention claimed is:

1. A method for implementing an auxiliary transport protocol for exchanging data between a sender computing device and a receiver computing device, comprising:
    storing, at the sender computing device, a plurality of routing records containing respective content type indicators and, for each content type indicator, (i) a message source identifier and (ii) a message destination identifier; the routing records including:
        a first routing record containing an initial content type indicator and a message destination identifier corresponding to a relay of the sender computing device; and
        a second routing record containing an extended content type indicator and a message destination identifier corresponding to a bridge of the sender computing device;
    responsive to generation of an initial message having a payload and the initial content type indicator identifying a local type of the payload within a primary transport protocol, routing the initial message to the relay of the sender computing device over a first connection established via the primary transport protocol according to the first routing record;
    at the relay of the sender computing device, responsive to receiving the initial message, generating an extended message having the payload and the extended content type indicator identifying a global type of the payload within the auxiliary transport protocol, and routing the extended message to the bridge of the sender computing device over a second connection established via the primary transport protocol according to the second routing record;
    at the bridge of the sender computing device, responsive to receiving the extended message, generating a converted extended message for transmission via the auxiliary transport protocol; and transmitting the converted extended message to the receiver computing device via the auxiliary transport protocol.

2. The method of claim 1, wherein the first routing record includes a message source identifier corresponding to a processing node.

3. The method of claim 1, wherein the second routing record includes a message source identifier corresponding to the relay of the sender computing device.

4. The method of claim 1, wherein generating the extended message comprises, at the relay of the sender computing device:

storing a mapping between the initial content type indicator and the extended content type indicator; and responsive to detecting the initial content type indicator, substituting therefor the extended content type indicator.

5. The method of claim 4, wherein storing the mapping comprises storing a plurality of mappings between respective initial content type indicators and respective extended content type indicators.

6. The method of claim 1, wherein the primary transport protocol is a Transmission Control Protocol/Internet Protocol TCP/IP-based protocol.

7. The method of claim 1, wherein the auxiliary transport protocol is Distribution Service for real-time Systems (DDS).

8. The method of claim 1, wherein generating the converted extended message comprises:

storing a mapping between a field according to the primary transport protocol and a corresponding field according to the auxiliary transport protocol; and generating the converted extended message according to the mapping.

9. The method of claim 1, further comprising:

receiving the converted extended message at a bridge of the receiver computing device;

generating an extended received message at the bridge of the receiver computing device for transmission via the primary transport protocol;

routing the extended received message at the receiver computing device according to a third connection established via the primary transport protocol according to a third routing record stored at the receiver computing device.

10. A computing device for implementing an auxiliary transport protocol for exchanging data between the computing device and a receiver computing device, comprising:

a processor;

a memory storing a plurality of routing records containing respective content type indicators and, for each content type indicator, (i) a message source identifier and (ii) a message destination identifier; the routing records including:

a first routing record containing an initial content type indicator and a message destination identifier corresponding to a relay of the computing device; and a second routing record containing an extended content type indicator and a message destination identifier corresponding to a bridge of the computing device; and a communications interface;

the processor configured to:

responsive to generation of an initial message having a payload and the initial content type indicator identifying a local type of the payload within a primary transport protocol, route the initial message to the relay of the computing device over a first connection established via the primary transport protocol according to the first routing record;

at the relay of the computing device, responsive to receiving the initial message, generate an extended message having the payload and the extended content type indicator identifying a global type of the payload within the auxiliary transport protocol, and route the extended message to the bridge of the computing device over a second connection established via the primary transport protocol according to the second routing record;

at the bridge of the computing device, responsive to receiving the extended message, generating a converted extended message for transmission via the auxiliary transport protocol; and control the communications interface to transmit the converted extended message to the receiver computing device via the auxiliary transport protocol.

11. The computing device of claim 10, wherein the first routing record includes a message source identifier corresponding to a processing node.

12. The computing device of claim 10, wherein the second routing record includes a message source identifier corresponding to the relay of the computing device.

13. The computing device of claim 10, the processor further configured to generate the extended message by, at the relay of the computing device:

storing a mapping between the initial content type indicator and the extended content type indicator; and responsive to detecting the initial content type indicator, substituting therefor the extended content type indicator.

14. The computing device of claim 13, the memory storing a plurality of mappings between respective initial content type indicators and respective extended content type indicators.

15. The method of claim 10, wherein the primary transport protocol is a Transmission Control Protocol/Internet Protocol TCP/IP-based protocol.

16. The computing device of claim 10, wherein the auxiliary transport protocol is Distribution Service for real-time Systems (DDS).

17. The computing device of claim 10, the processor further configured to generate the converted extended message by:

retrieving from the memory a mapping between a field according to the primary transport protocol and a corresponding field according to the auxiliary transport protocol; and generating the converted extended message according to the mapping.

18. A non-transitory computer readable medium storing a plurality of computer-readable instructions executable by a processor of a sender computing device for performing a method for implementing an auxiliary transport protocol for exchanging data between the sender computing device and a receiver computing device, comprising:

storing, at the sender computing device, a plurality of routing records containing respective content type indicators and, for each content type indicator, (i) a message source identifier and (ii) a message destination identifier; the routing records including:

a first routing record containing an initial content type indicator and a message destination identifier corresponding to a relay of the sender computing device; and a second routing record containing an extended content type indicator and a message destination identifier corresponding to a bridge of the sender computing device;

responsive to generation of an initial message having a payload and the initial content type indicator identifying a local type of the payload within the primary transport protocol, routing the initial message to the relay of the sender computing device over a first connection established via the primary transport protocol according to the first routing record;

at the relay of the sender computing device, responsive to receiving the initial message, generating an extended message having the payload and the extended content type indicator identifying a global type of the payload within the auxiliary transport protocol, and routing the extended message to the bridge of the sender computing device over a second connection established via the primary transport protocol according to the second routing record;

at the bridge of the sender computing device, responsive to receiving the extended message, generating a converted extended message for transmission via the auxiliary transport protocol; and transmitting the converted extended message to the receiver computing device via the auxiliary transport protocol.

* * * * *